Figures 1, 2:
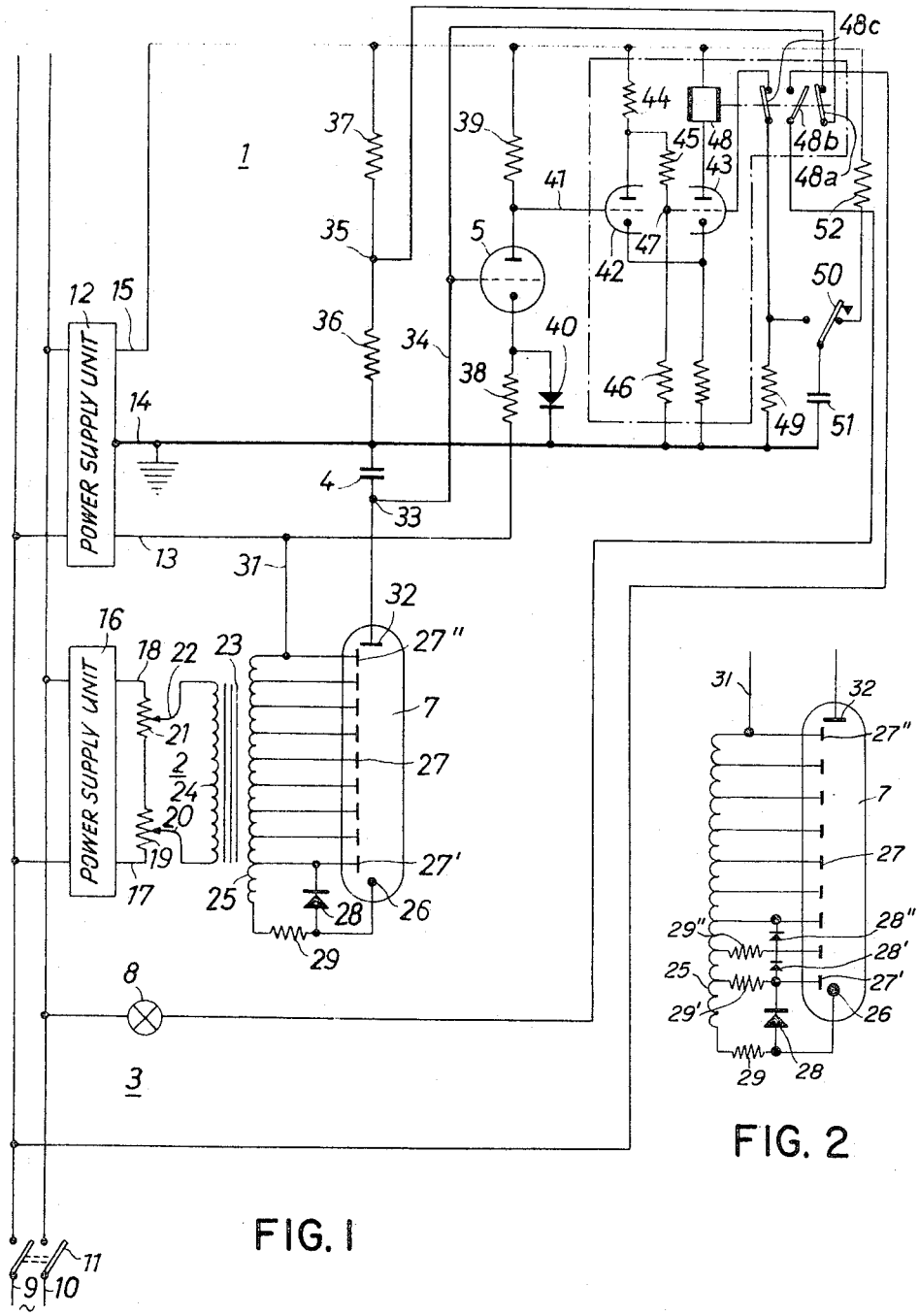

INVENTORS
RICHARD WICK
GÜNTHER ROOS

BY Michael S. Striker

United States Patent Office 3,296,445
Patented Jan. 3, 1967

3,296,445
MEASURING ARRANGEMENT USING PHOTO-
MULTIPLIER TUBE WITH DARK CURRENT
CORRECTION
Gunther Roos, Munich, and Richard Wick, Grunwald, bei Munich, Germany, assignors to AGFA Aktiengesellschaft, Leverkusen, Germany
Filed Dec. 5, 1963, Ser. No. 328,299
Claims priority, application Germany, Dec. 12, 1962, A 41,851
6 Claims. (Cl. 250—207)

The present invention concerns a photoelectric measuring arrangement, particularly suitable for controlling photographic printing devices. More particularly, the invention concerns that type of such arrangements which comprise a so-called secondary emission or photomultiplier tube energized by a source of alternating current.

Particularly where such photomultiplier tubes are utilized in photographic printing apparatus employed in making color prints, the photomultiplier tubes used for measuring or controlling the exposure or illumination have to meet frequently quite a number of conditions. For instance, the particular photomultiplier tube is expected to be sensitive in the red as well as in the green and blue spectral range to a sufficient degree but should nevertheless carry only a minute current when the tube is not exposed to light because the currents flowing during the not-exposed condition would add themselves to the actual photo-current produced upon illumination, which would entail, particularly in the case of comparatively long exposure times, wrong results, because the exposure time period between switching on and switching off the source of illumination would be too short.

However, it has been found that photomultiplier tubes on the market and available for being used in arrangements of the type mentioned above are characterized by carrying, while not being exposed to light, currents which in many cases exceed a permissible maximum.

It is, therefore, one object of this invention to provide for a photoelectric measuring arrangement including photomultiplier tube means in which the flow of dark current furnished by the tube while it is not exposed to light is reduced or eliminated.

It is another object of this invention to provide for an arrangement as just mentioned which is comparatively simple and inexpensive and entirely reliable in operation.

With above objects in view the invention includes in a photoelectric measuring arrangement, particularly suitable for controlling photographic printing devices, in combination, a source of alternating current; photomultiplier tube means having an anode, a cathode and dynodes, said cathode and dynodes being connected to said source for being energized thereby and said cathode being arranged for being exposed to illumination, for furnishing an output current substantially proportional to the intensity of illumination applied to said cathode; electric circuit means connected to said photomultiplier tube means at said anode and responsive to said output current; and connection means including rectifier means arranged between said cathode and at least one of said dynodes with a polarity for blocking current flow through said connection means in the direction from said dynode to said cathode.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing in which:

FIG. 1 is a schematic circuit diagram of one embodiment of the invention when part of a photographic printing apparatus; and FIG. 2 is a partial schematic diagram of another embodiment of the arrangement of the photomultiplier tube shown in FIG. 1.

As can be seen, the arrangement as illustrated in FIG. 1 comprises three main portions, namely a control circuit arrangement 1 including a timing capacitor 4, an electron tube 5 and a circuit interrupter unit 6, moreover a photoelectric measuring circuit 2 including a photomultiplier tube 7, and finally an illumination circuit 3 including a printing light source 8 forming part of the otherwise not illustrated photographic printing device. It is to be assumed that the photomultiplier tube is to arranged within the printing apparatus that in a well known manner the cathode of the photomultiplier tube is illuminated by the rays emanating from the light source 8 after these rays have passed through the transparency from which prints are to be made.

Each of the above mentioned three portions or circuits of the entire arrangement is connected to a line system 9, 10 which carries alternating current and includes a main switch 11. The control circuit 1 is connected to the supply line system by means of a conventional power supply unit 12 which is not illustrated in detail but contains a rectifier arrangement so as to furnish direct current voltage at its output terminals 13, 14 and 15. Output terminal 14 is connected to ground while output 13 carries a direct current voltage of −150 volts and the output 15 carries a direct current voltage of +150 volts.

Also the light measuring circuit 2 is connected with the alternating current furnishing line system by means of a conventional power supply unit 16 which is likewise not illustrated in detail but is so constructed that it furnishes at its outputs 17 and 18 a stabilized square wave alternating voltage. The outputs 17 and 18 are connected with each other by two series-connected potentiometer-type resistors 19 and 21 having adjustable taps 20 and 22, respectively, which, in turn, are connected with the ends of the primary winding 24 of a high voltage step-up transformer 23. The secondary winding 25 of this transformer supplies in a well known manner the cathode 26 and the dynodes 27 of the photomultiplier tube 7.

In accordance with the invention the lead from the secondary 25 to the first dynode 27′ is connected with the lead from the secondary 25 to the cathode 26 by a connection including a diode or rectifier 28, e.g. of the silicon type which is so arranged that a current flow through this connection from the dynode 27′ to the cathode 26 is blocked. Preferably, as illustrated a current limiting resistor 29 is connected between the end of the secondary 25 and the junction point between the diode 28 and the cathode 26.

The last dynode 27″ of the photomultiplier tube 7 is connected by a lead 31 with the output terminal 13 of the power supply unit 12 while the anode 32 of the tube 7 is connected via the timing capacitor 4 of the control circuit with the grounded output line 14.

On the side toward the anode 32 the terminal 33 of the timing capacitor 4 is connected by a lead 34 and by a relay switch contact 48a with a junction point 35 within a voltage divider arrangement formed by resistors 36 and 37. These two resistors are connected in series with each other between the output leads 14 and 15 and are so dimensioned that the intermediate point 35 carries a voltage of +30 volts. However, the terminal 33 of the timing capacitor 4 is also connected by the lead 34 with the grid of the electron tube 5 which is connected with a resistor 38 on the cathode side and with a resistor 39 on the anode side between the leads 13 and 15. The cathode of the tube 5 is additionally connected via a diode 40 with the grounded lead 14, the diode 40 being so arranged that it blocks flow of current from the grounded line 14 to the cathode of the tube 5.

The anode of the tube 5 is connected by a lead 41 with the input terminal of the current interrupter unit 6 which is constructed in a well known and conventional manner as a Schmitt-trigger circuit. This trigger circuit comprises a twin tube 42, 43, a voltage divider composed of the resistors 44, 45 and 46 of which the resistor 44 is located in the anode circuit of the tube portion 42 while its tapping point 47 is connected with the grid of the tube portion 43, and finally a relay coil 48 located in the anode circuit of the tube portion 43. The relay coil 48 actuates when energized a plurality of relay switches namely the above-mentioned relay switch 48a, a switch 48b in the circuit of the light source 8 and a relay switch 48c which will be described further below.

The grid of the tube portion 43 of the current interrupter unit 6 is connected via the relay switch 48c and a resistor 49 with the grounded line 14. An exposure starting switch 50 constructed as a change-over switch is provided for connecting when desired a capacitor 51 in parallel with the resistor 49 while in the illustrated normal position of the switch 50 the capacitor 51 can be charged across a resistor 52 to the potential existing between the grounded line 14 and the positive supply line 15.

The entire arrangement as described above which is illustrated in the drawing in a condition when none of the components are energized, functions as follows.

After the main switch 11 has been moved to closed position first of all the relay coil 48 remains not-energized because the grid of the tube portion 43 of the current interrupter unit 6 is still connected via the relay switch 48c and the resistor 49 with ground. Consequently all the relay switches 48a, 48b and 48c which are controllable by the coil 48 remain in their respective normal positions as illustrated. Thus, while the source of light 8 still remains not-energized the timing capacitor 4 is charged to a potential of +30 volts. The tube 5 is rendered conductive and at the same time the control capacitor 51 is charged to a potential of +150 volts.

For starting an exposure the starting switch 50 is moved for a short period of time to its second position whereby the grid of the tube portion 43 is supplied for a correspondingly short period of time with positive potential. Consequently the tube portion 43 is rendered conductive and the Schmitt-trigger arrangement is activated so that the relay coil 48 is energized and moves its associated relay switch contacts 48a, 48b and 48c to their respective second positions. The starting capacitor discharges, as long as switch 50 is in its second position, via resistor 49, however, the flow of current through the tube portion 43 continues because the switch contact 48c has been moved to open position. Thus the relay coil 48 remains energized.

Since, as stated above, the relay switch 48b has been closed by the energization of the coil 48, the source of light 8 of the printing device is now switched on so that in this printing device the exposure is started and the cathode 26 of the photomultiplier tube 7 is irradiated with the printing light. The resulting photocurrent furnished by the multiplier tube 7 is substantially proportional to the intensity of illumination impinging on the cathode 26 and thus proportional to the average density of the transparency from which the prints are to be made.

The photocurrent furnished by the photomultiplier tube 7 causes first of all a discharge of the timing capacitor 4 and hereafter a negative charge thereof since in the meantime deenergization of the relay coil 48 has caused the relay switch contact 48a to assume open position. Together with the charge potential of the timing capacitor 4 also the potential at the grid of the tube 5 drops so that the anode current of this tube decreases. Consequently the anode potential of this tube increases while the cathode potential decreases.

As soon as the charge potential of the timing capacitor 4 has decreased to a predetermined value the cathode of the tube 5 assumes the potential of the ground lead 14 so that as a consequence current from the lead 13 starts to flow via the cathode resistor 38 and the diode 40 to the grounded lead 14. Consequently the current flowing through the tube 5 decreases and the anode potential increases rapidly in view of the decreasing voltage drop across the anode resistor 39 until the anode potential reaches a value which is sufficient for again activating the current interrupter unit 6. Now the tube portion 42 of the unit 6 starts to be conductive and the Schmitt-trigger snaps back into its normal condition so that now the tube 43 becomes non-conductive and the relay coil 48 is deenergized. With the deenergization of the coil 48 all the relay switches 48a, 48b and 48c return also to their normal position so that now the source of printing light 8 is switched off and the exposure in the printing apparatus is terminated. The entire arrangement has thus returned to its original condition and is ready for a new cycle or exposure.

It will be understood that in the above-described arrangement the time periods between switching on and switching off the light source 8 correspond, in view of the extremely small current carried by the tube 7 during non-exposure to light, very accurately to the amount of illumination applied during that period to the cathode 26 of the tube 7.

The minute amount of current carried by the tube 7 during non-exposure to light is due to the following facts. During the one half cycle of each alternating current period the lead from the secondary 25 to the cathode 26 is negative relative to the lead between the secondary 25 and the first dynode 27'. Under these circumstances the rectifier 28 practically blocks a flow of current through the connection between these two leads. That current which is able to flow in a direction opposite to the blocked direction through the rectifier 28 and the photocurrent of the multiplier tube 7 is so small that during the above-mentioned half cycle no noticeable voltage drop appears across the resistor 29. Thus it can be stated that for all practical purposes the rectifier 28 and the resistor 29 have no effect during the above-mentioned half cycle.

However, during the other half cycle of each alternating current period, if the rectifier 28 were not provided, the cathode 26 would carry positive potential relative to the first dynode 27'. Now, by providing the rectifier 28 in accordance with the invention a current is caused to flow across the rectifier 28 during said second half cycle so that the circuit between the cathode 26 and the first dynode 27' is practically shunted or short-circuited. Thus the cathode 26 has practically the same potential as the first dynode 27'. The resistor 29 limits the current flowing through said shunt connection to so small a value that the transformer 23 is not premagnetized to any noticeable degree and therefore the output voltage is not decreased as a consequence of saturation. Since during said second half cycle the cathode 26 is not positive relative to the first dynode 27' no electrons which have been forced by always present ions out of the dynodes 27 and which are amplified by the intermediate stages of the tube, can impinge on the cathode 26 so that also no secondary electrons can be forced in this manner out of the cathode 26. However such secondary electrons would during the next half cycle and the corresponding change of polarity of the tube 7 travel toward the dynode 27' and consequently misleadingly increase the actual photocurrent.

It will be understood that the above-described advantages of the arrangement according to the invention are obtainable also if the rectifier 28 is not arranged between the cathode 26 and the first dynode 27' but between the cathode 26 and any other one of the following dynodes 27. The only different result would be that the voltage which is applied to the rectifier 28 is increased in this case. On the other hand, it is also possible to arrange a plurality of rectifiers 28 between the cathode 26 and different ones of the dynodes, respectively, as shown in the arrangement of FIG. 2.

Although through the invention the current flow from a photomultiplier tube 7 during its non-exposure to light is greatly reduced, nevertheless even under these circumstances produced by the invention the advantage is maintained that with photomultiplier tubes operated with alternating current current leaks caused by poor insulation within the multiplier tube or at its socket and which in the case of direct voltage operation also can contribute to increasing the current flow during non-exposure to light, remain without any effect because their positive and negative portions compensate each other.

It is easy to understand that the invention is advantageously applicable not only to exposure control devices but also generally in all devices for carrying out photoelectric measurements.

It will be understood that each of the elements described above, or two or more together, may also find a useful application in other types of a photoelectric measuring arrangement differing from the types described above.

While the invention has been illustrated and described as embodied in a photoelectric measuring arrangement comprising a photomultiplier tube, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photoelectric measuring arrangement, particularly suitable for controlling photographic printing devices, in combination, a source of alternating current; photomultiplier tube means having an anode, a cathode and dynodes, said cathode and dynodes being connected to said source for being energized thereby and said cathode being arranged for being exposed to illumination, for furnishing an output current substantially proportional to the intensity of illumination applied to said cathode; electric circuit means connected to said photomultiplier tube means at said anode and responsive to said output current; and connection means including rectifier means arranged between said cathode and at least one of said dynodes with a polarity for blocking current flow through said connection means in the direction from said dynode to said cathode.

2. In a photoelectric measuring arrangement, particularly suitable for controlling photographic printing devices, in combination, a source of alternating current; photomultiplier tube means having an anode, a cathode and dynodes, said cathode and dynodes being connected to said source for being energized thereby and said cathode being arranged for being exposed to illumination, for furnishing an output current substantially proportional to the intensity of illumination applied to said cathode; electric circuit means connected to said photomultiplier tube means at said anode and responsive to said output current; and connection means including rectifier means arranged between said cathode and the first one of said dynodes with a polarity for blocking current flow through said connection means in the direction from said dynode to said cathode.

3. In a photoelectric measuring arrangement, particularly suitable for controlling photographic printing devices, in combination, a source of alternating current; photomultiplier tube means having an anode, a cathode and dynodes, said cathode and dynodes being connected to said source for being energized thereby and said cathode being arranged for being exposed to illumination, for furnishing an output current substantially proportional to the intensity of illumination applied to said cathode; electric circuit means connected to said photomultiplier tube means at said anode and responsive to said output current; and a plurality of connection means each including rectifier means arranged between said cathode and a different one of said dynodes, respectively, with a polarity for blocking current flow through said connection means in the direction from said dynode to said cathode.

4. An arrangement as claimed in claim 1, including current limiting resistance means in the connection between said source and said cathode.

5. An arrangement as claimed in claim 2, including current limiting resistance means in the connection between said source and said cathode.

6. An arrangement as claimed in claim 3, including current limiting resistance means in the connection between said source and said cathode.

References Cited by the Examiner

UNITED STATES PATENTS

| | | | |
|---|---|---|---|
| 2,534,668 | 12/1950 | Gunderson | 250—207 |
| 2,647,436 | 8/1953 | Shapiro | 315—202 X |
| 3,067,360 | 12/1962 | Justice et al. | 328—243 X |
| 3,076,896 | 2/1963 | Smith | 250—207 |

RALPH G. NILSON, *Primary Examiner.*

W. STOLWEIN, *Assistant Examiner.*